Dec. 8, 1936.  S. W. SPARKS  2,063,563
MANUFACTURE OF EXTRUDED METAL SHAPES BY HOT HYDRAULIC EXTRUSION
Filed Aug. 27, 1934  13 Sheets-Sheet 3

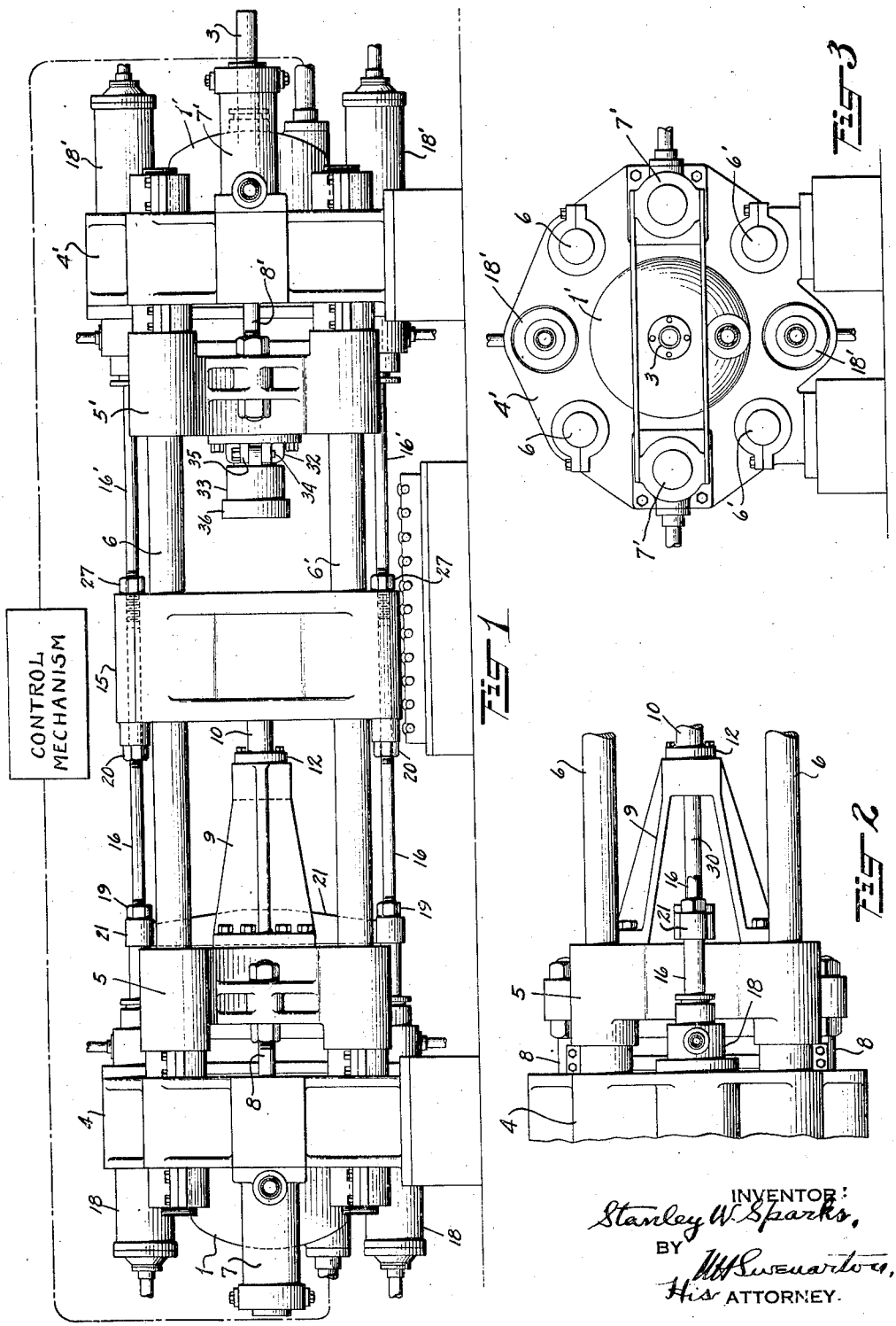

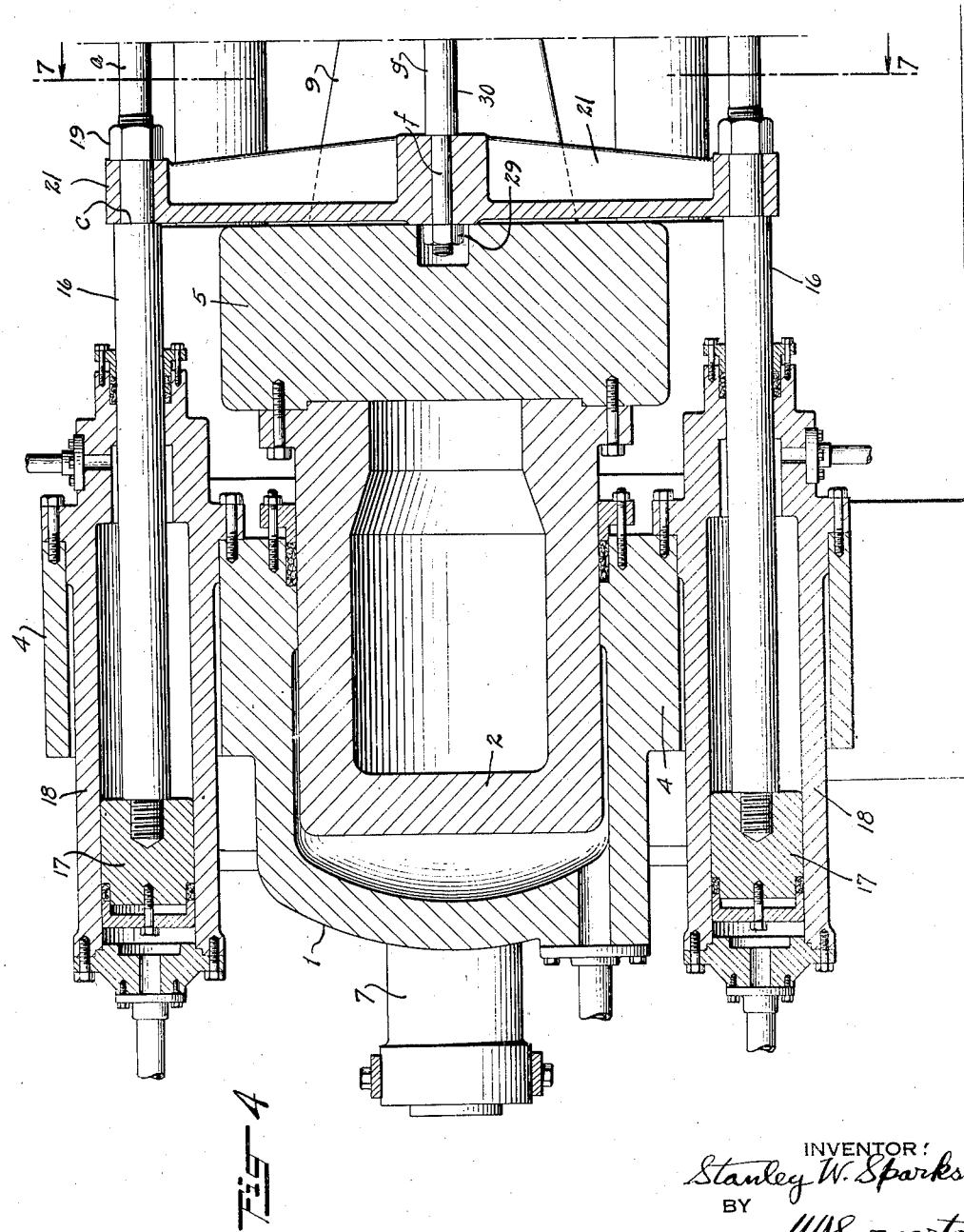

INVENTOR:
Stanley W. Sparks,
BY
His ATTORNEY.

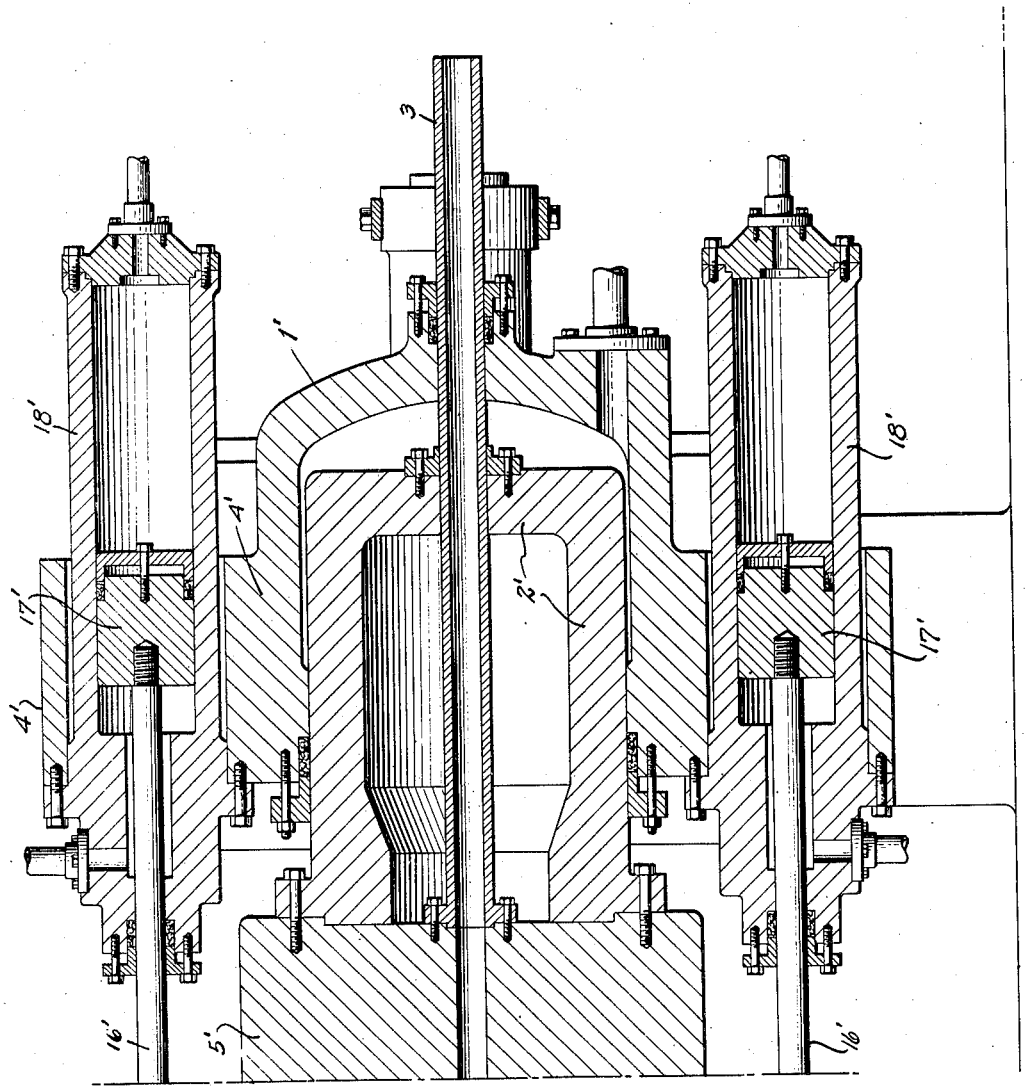

Dec. 8, 1936.    S. W. SPARKS    2,063,563
MANUFACTURE OF EXTRUDED METAL SHAPES BY HOT HYDRAULIC EXTRUSION
Filed Aug. 27, 1934    13 Sheets-Sheet 5
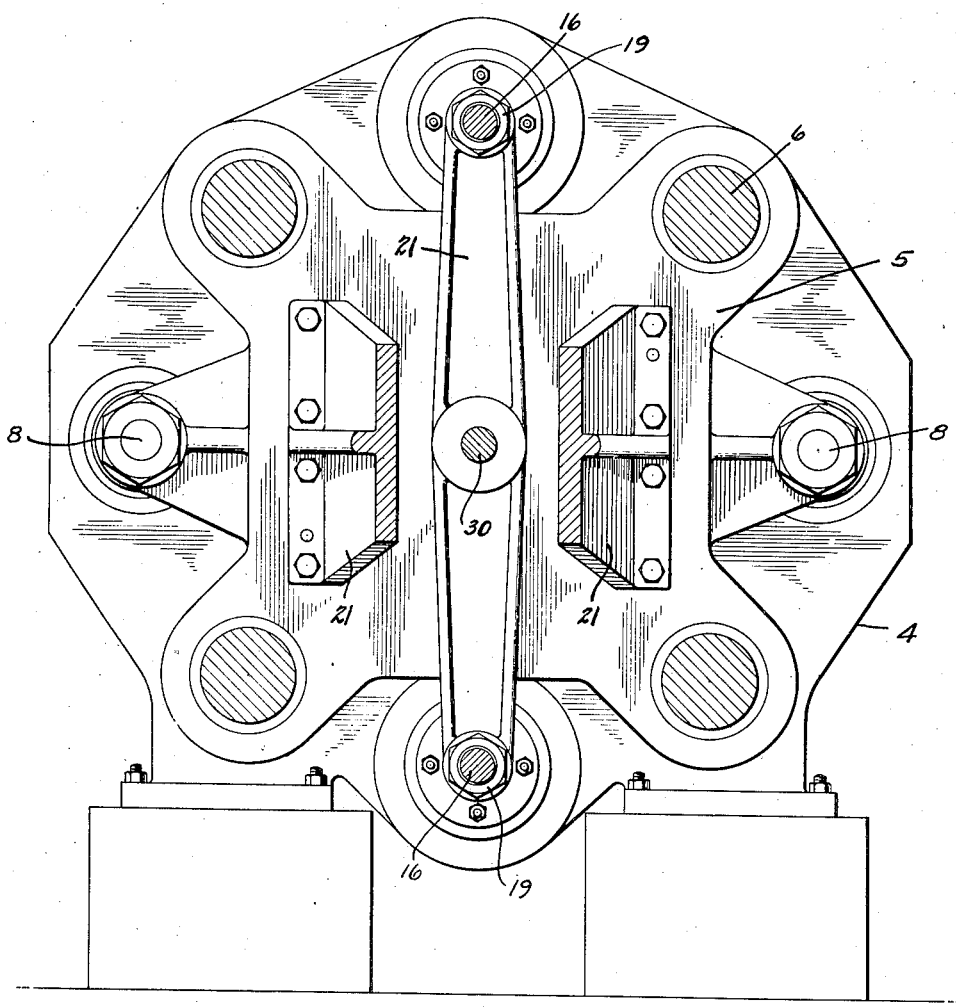

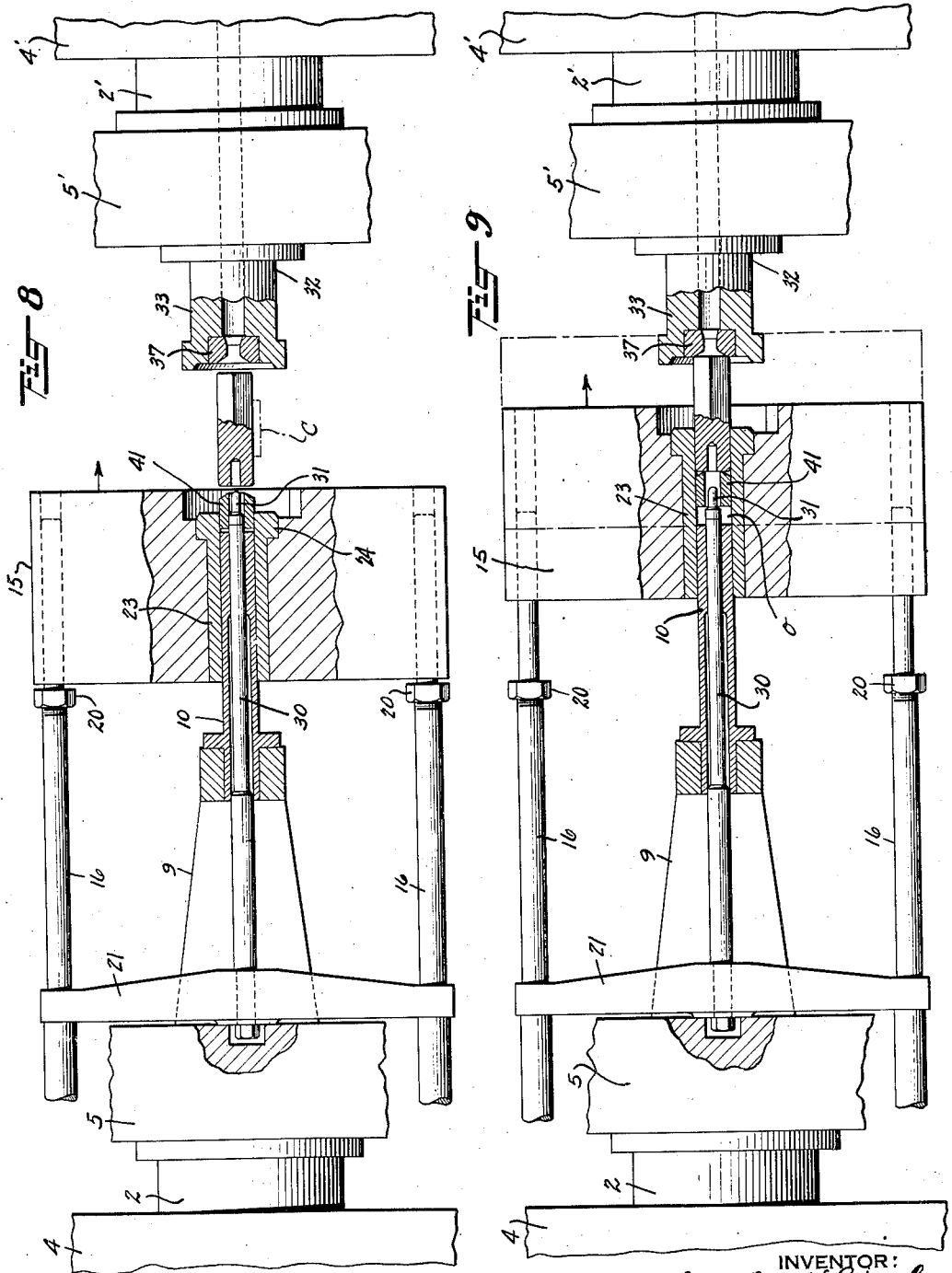

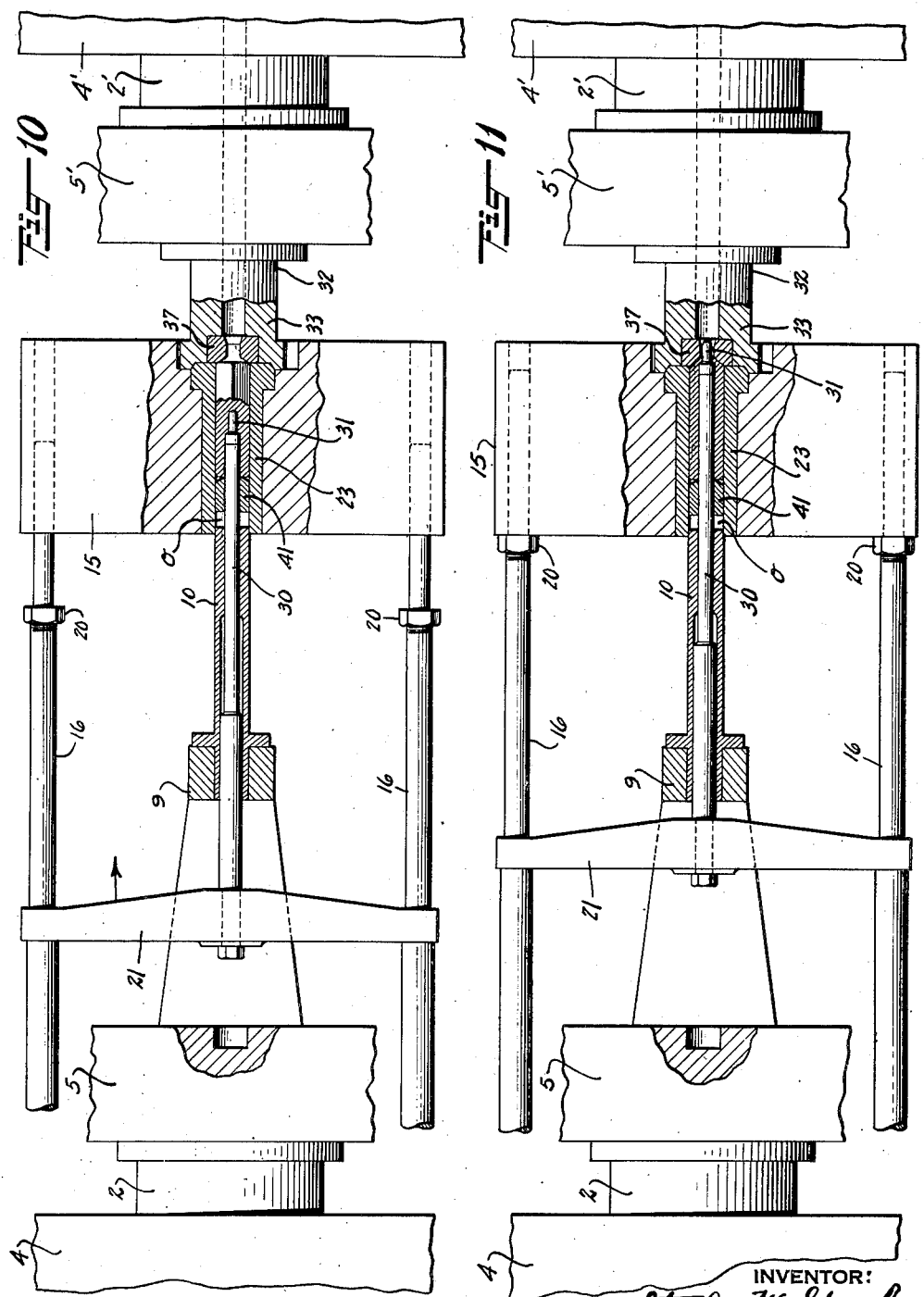

Dec. 8, 1936.  S. W. SPARKS  2,063,563
MANUFACTURE OF EXTRUDED METAL SHAPES BY HOT HYDRAULIC EXTRUSION
Filed Aug. 27, 1934  13 Sheets-Sheet 8
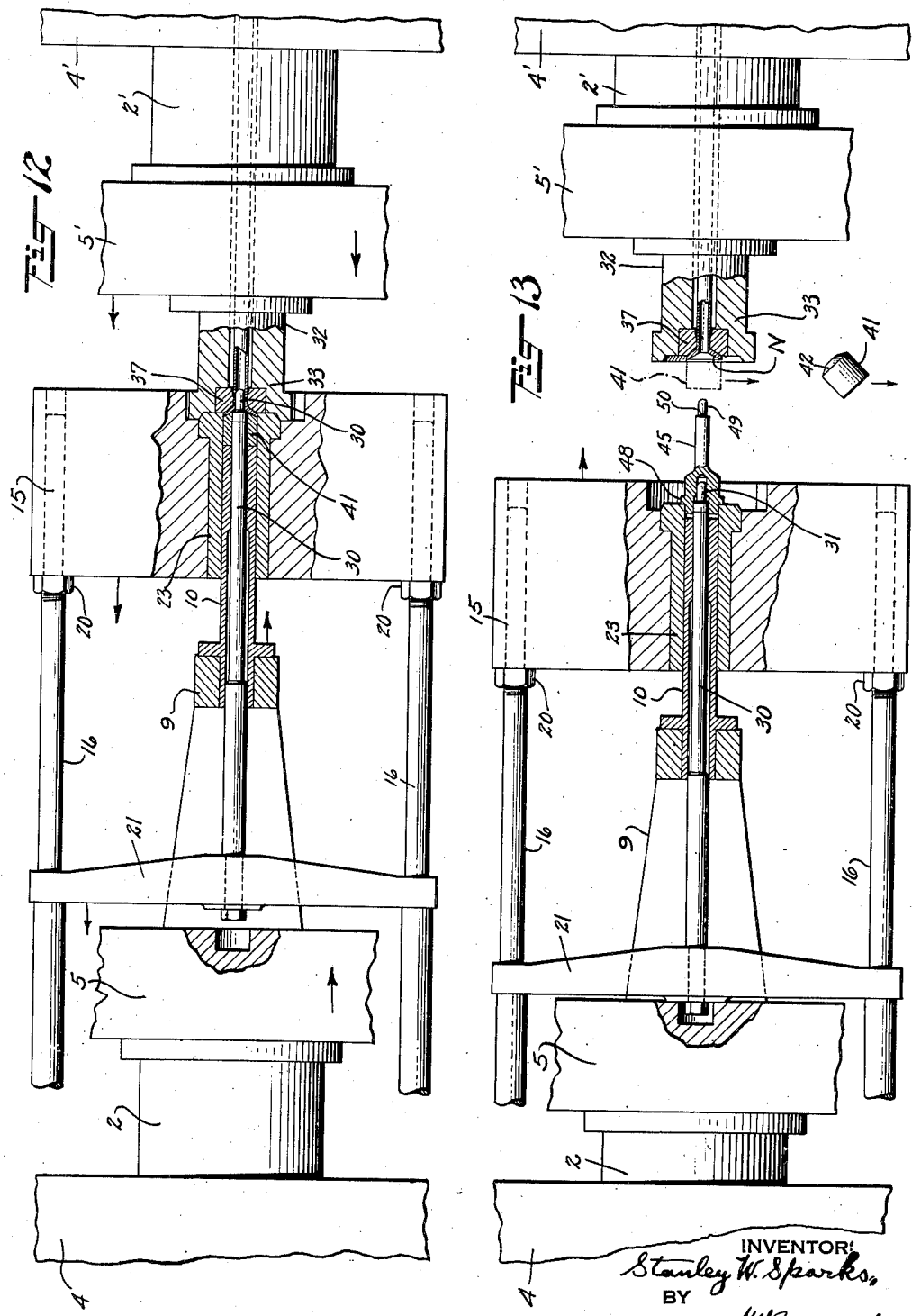
INVENTOR:
Stanley W. Sparks,
BY
His ATTORNEY.

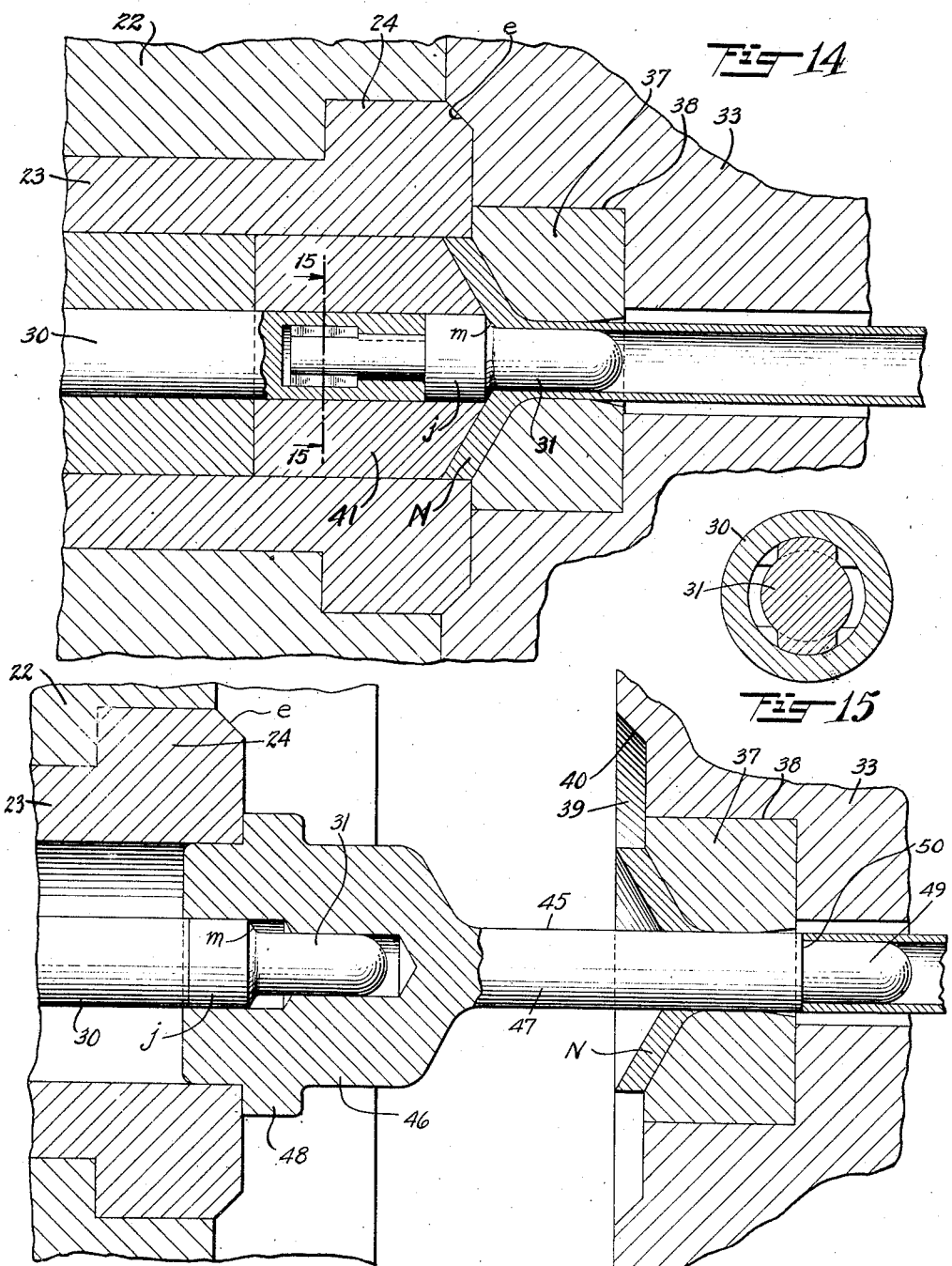

Dec. 8, 1936.      S. W. SPARKS                    2,063,563
   MANUFACTURE OF EXTRUDED METAL SHAPES BY HOT HYDRAULIC EXTRUSION
              Filed Aug. 27, 1934       13 Sheets-Sheet 10
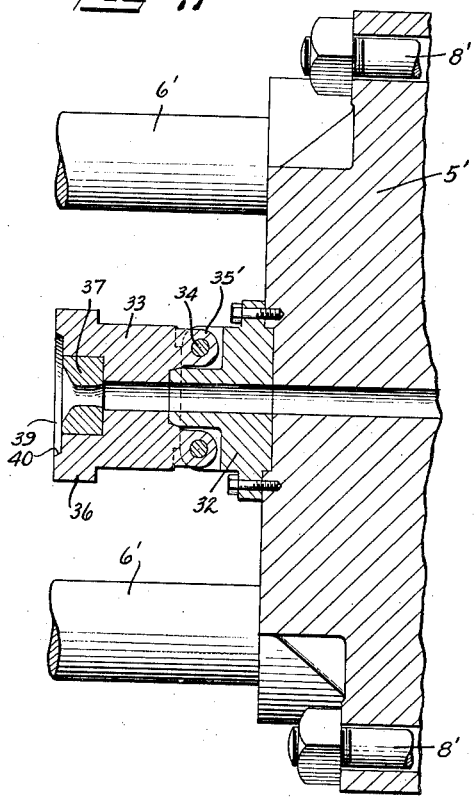
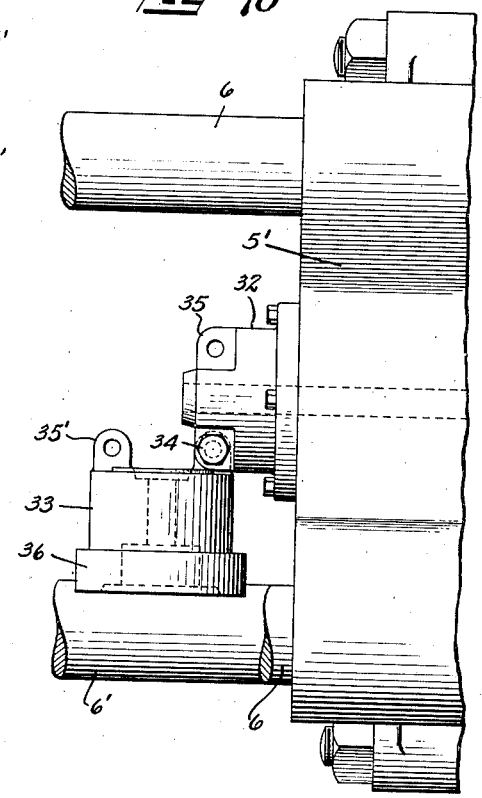
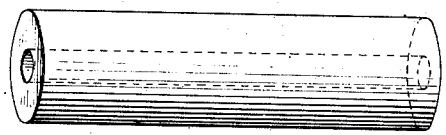
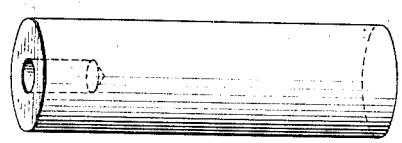
INVENTOR:
Stanley W. Sparks,
BY
H. W. Swenarton,
    ATTORNEY.

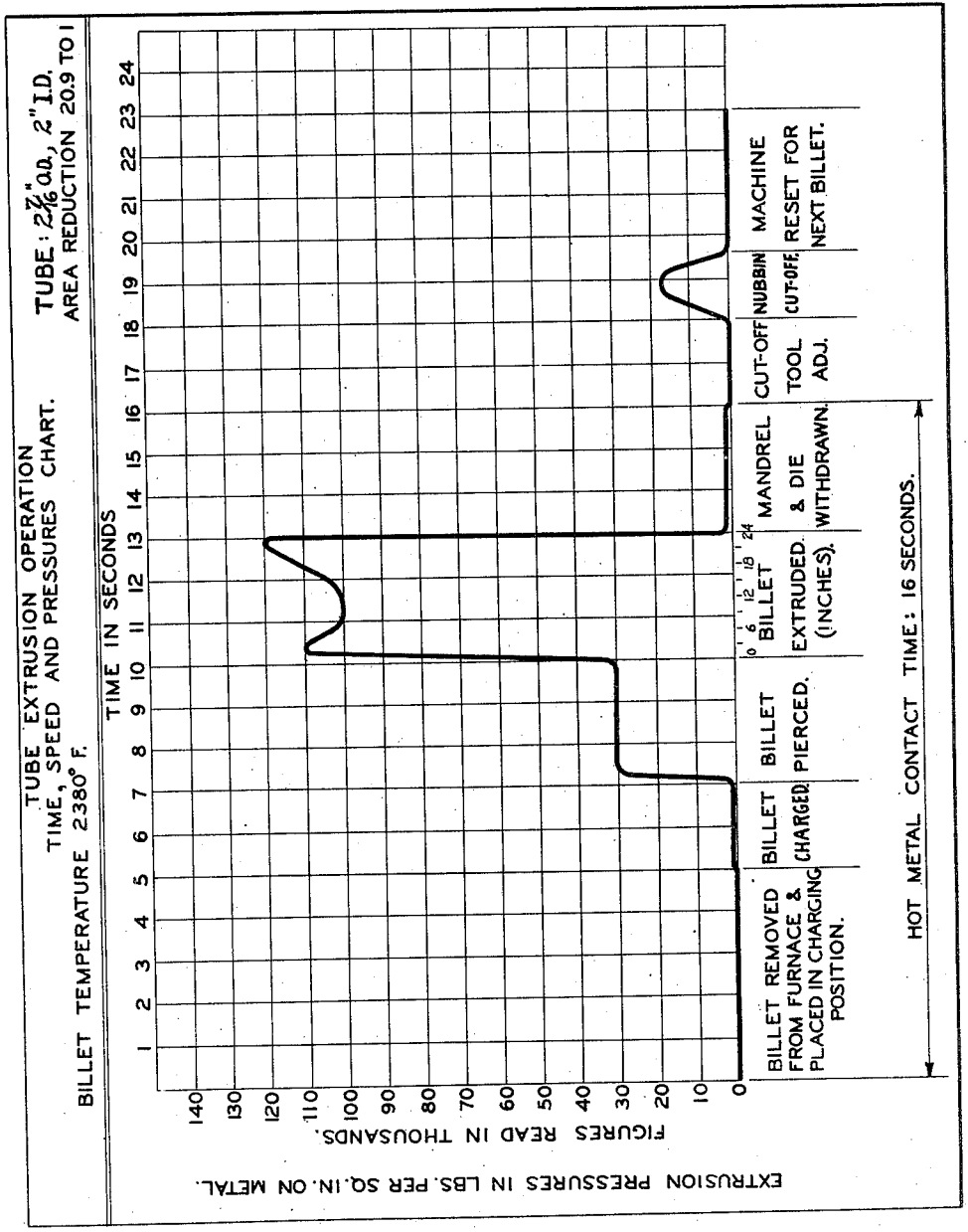

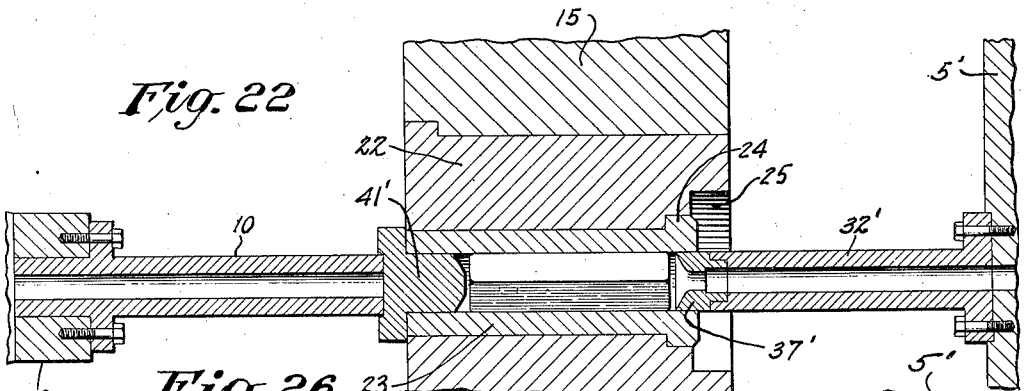
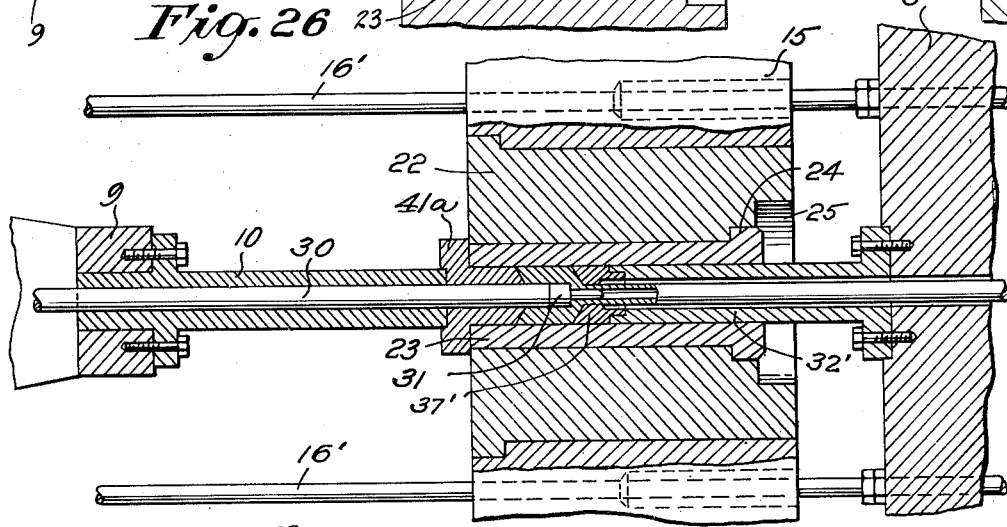
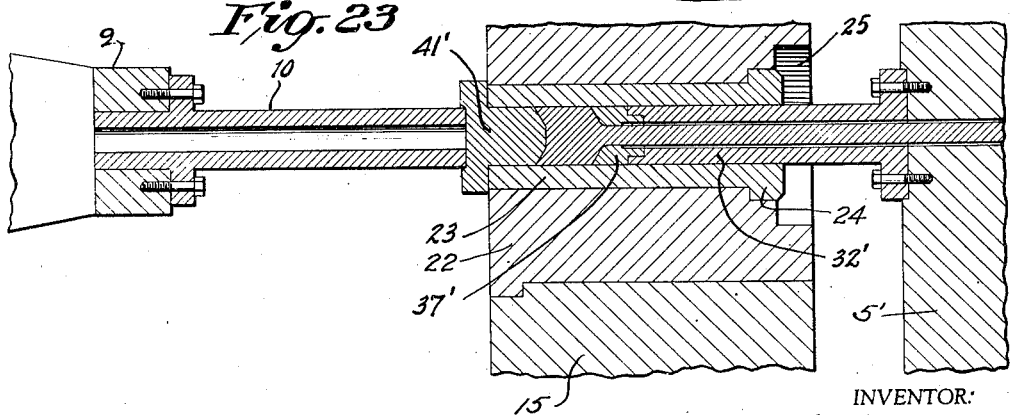

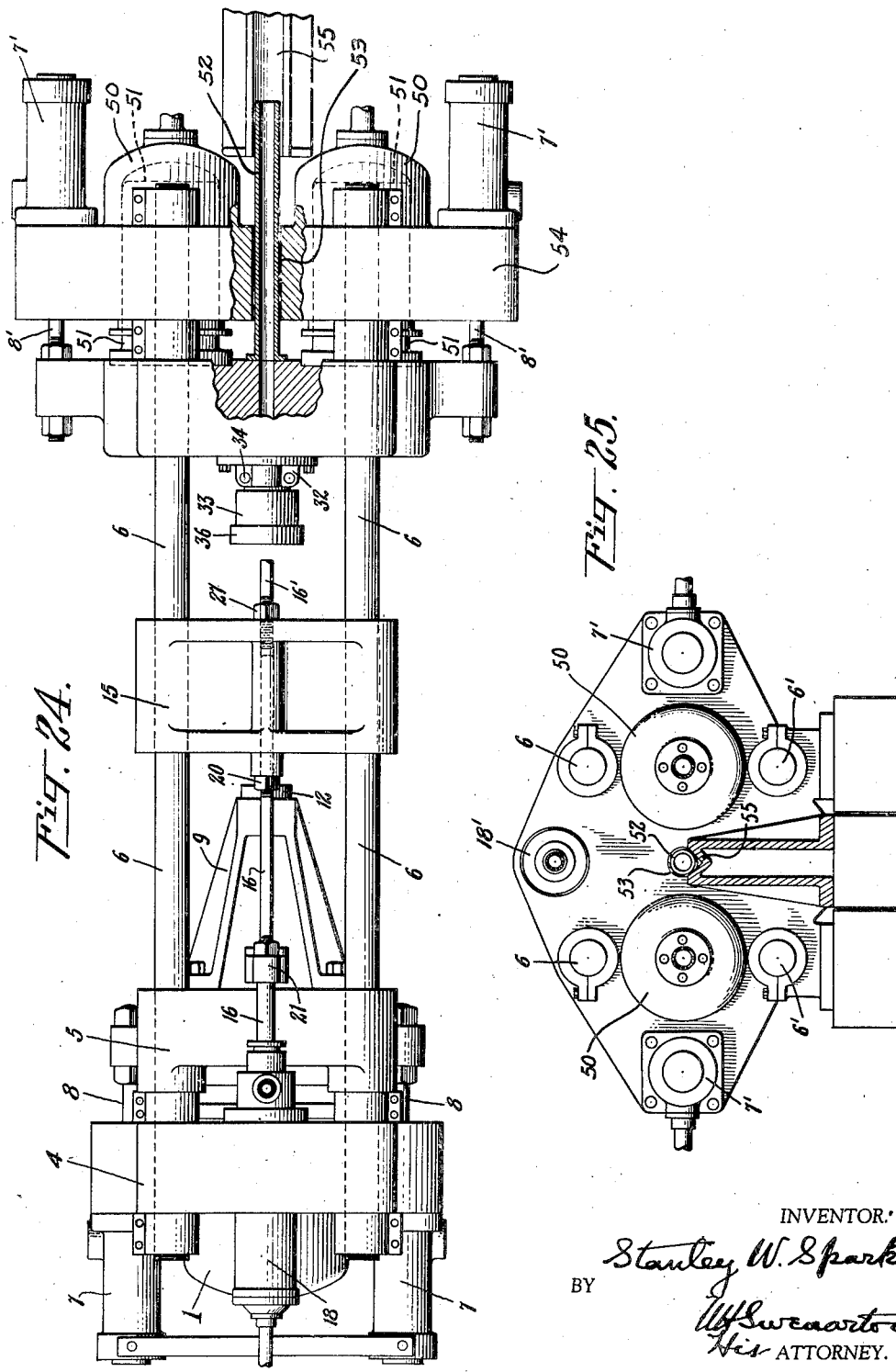

Patented Dec. 8, 1936

2,063,563

UNITED STATES PATENT OFFICE 2,063,563

MANUFACTURE OF EXTRUDED METAL SHAPES BY HOT HYDRAULIC EXTRUSION

Stanley W. Sparks, Norwalk, Conn., assignor to Sparks Processes, Incorporated, Norwalk, Conn., a corporation of Connecticut Application August 27, 1934, Serial No. 741,558

19 Claims. (Cl. 207—10)

This invention is related to my copending application Serial No. 720,167, filed April 12, 1934, and relates to an improved method and apparatus for the economical production of elongated, solid and tubular shapes of steel and alloys thereof, wrought iron and non-ferrous metals, such as copper, brass, bronze, aluminum and the like, and has for its principal objects the high speed, hot extrusion, in hydraulic press equipment, of such shapes with a minimum expenditure of power and a minimum deterioration or wear of equipment and of the dies employed, and which shapes are of greatly reduced section, as compared with that of the metal blanks processed, of smooth finish and, in the case of hollow shapes, have a dense wall section of uniform thickness and homogeneous structure. Other advantages are hereinafter set forth.

It has long been recognized in the extrusion art that rapidity of operation is a prime factor in the successful extrusion of metals and particularly of ferrous metals, since unless a high degree of plasticity of the metal can be maintained in the blank being extruded and the rapid flow of the metal through the container and die is effected, enormous horsepower is required to complete the extrusion, and consequently the wear on the die and mandrel, due to friction thereon and the deleterious effects resulting from prolonged heating thereof, is so great as to be virtually prohibitive in cost, especially if a shape of considerably reduced section as compared with the blank from which it is extruded and a shape of smooth finish is to be obtained. In an attempt to accomplish such high speed extrusion, resort has been had, as set forth in Patent No. 1,892,789, to high speed mechanical presses in which the extrusion tool was caused to move at an average of over 5" per second, a speed which was considerably in excess of the maximum speed of extrusion tool movement in any known hydraulic press equipment. However, the enormous shock of impact of such rapidly moving extrusion tool upon the blank necessitated not only the employment of a very expensive mechanical press having heavy rugged parts, but also entails an excessively high upkeep cost due to the enormous pressures required to be suddenly exerted by such equipment upon the blank to be extruded. Furthermore, owing to the inherent limitations of such high speed mechanical extrusion methods, the size of billet which can be operated upon is restricted to a length-diameter ratio of not over 2½ to 1 whereas in my improved high speed hydraulic method of extrusion billets having a length considerable in excess of three times the diameter thereof can be successfully and economically extruded.

The hydraulic extrusion of metals has always been a desideratum, but due to the limitations of the speed of movement of hydraulically operated plungers in the hydraulic extrusion equipment, it has heretofore not been possible to accomplish the effective and economical hydraulic extrusion of metals, and particularly long lengths of tubular shapes of smooth inside and outside finish, as well as solid shapes, with a minimum of expense for original equipment and for power and maintenance of equipment, as well as for die and mandrel wear, an attainment which can be successfully accomplished by practicing my invention.

In the accompanying drawings, in which I have illustrated, principally diagrammatically, an example of the manner in which my improved hot extrusion hydraulic method is accomplished and a preferred form of apparatus for carrying out such method, Figure 1 is a longitudinal elevation;

Fig. 2 is a fragmentary plan view; and

Fig. 3 a rear end elevation of a duplex hydraulic press embodying my invention;

Figs. 4, 5 and 6 are enlarged fragmentary vertical sections of the left end of the apparatus, the mid-section thereof and the right end, respectively, of the apparatus;

Fig. 7 is a transverse vertical section on the line 7—7 of Fig. 4;

Figure 5:
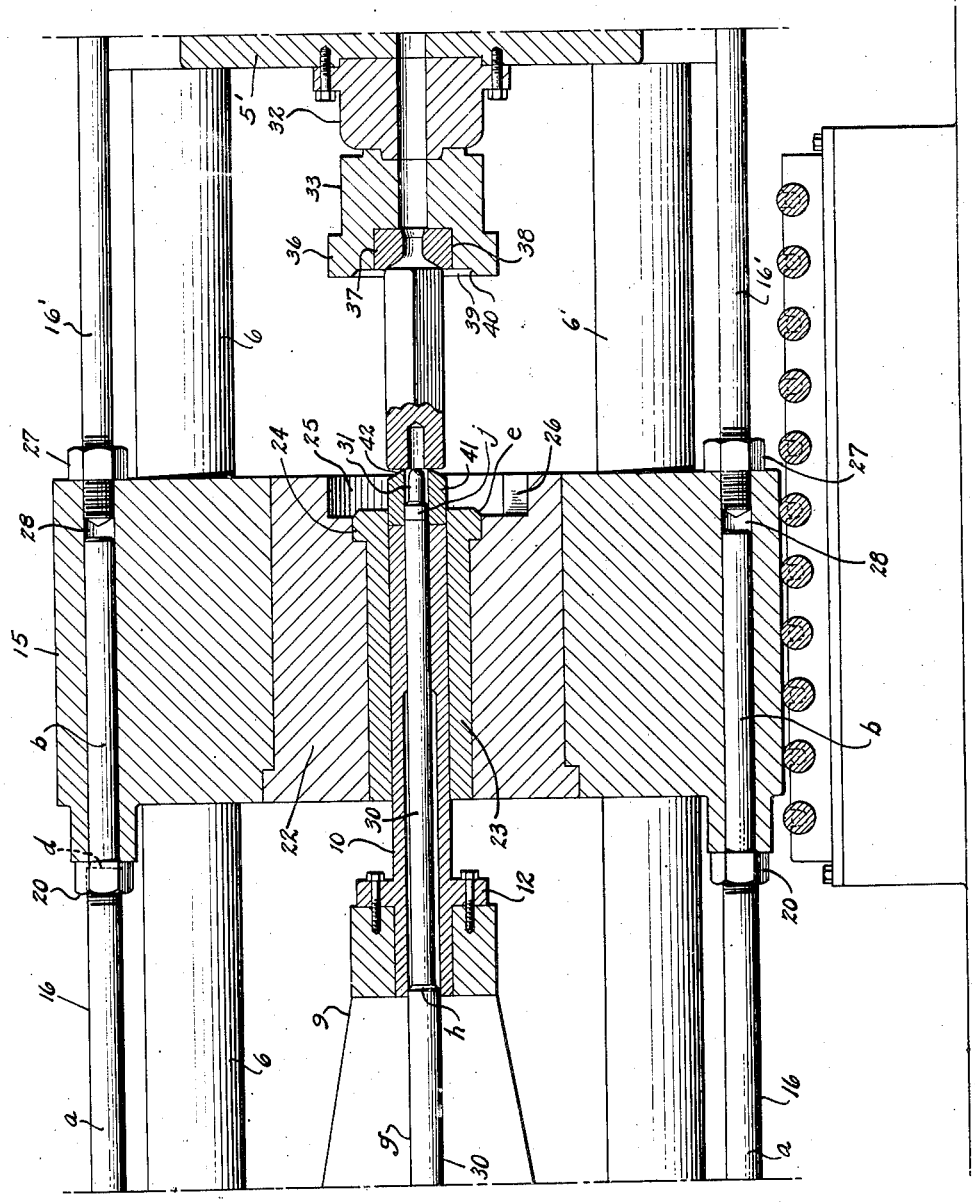

Figs. 8, 9, 10, 11, 12 and 13 are longitudinal vertical sections, generally diagrammatic, showing respectively the position of the floating container and the parts immediately adjacent thereto in the different stages of a tube forming operation, viz.: at the moment of presentation of the billet to the container (Fig. 8); with billet partially charged into the container and showing position of container in dot and dash lines at completion of billet charging stroke (Fig. 9); during the piercing of the billet (Fig. 10); at the completion of the piercing stroke (Fig. 11); at the completion of the extrusion stroke (Fig. 12); and immediately following the positioning of the stripping tool (Fig. 13);

Fig. 14 is a fragmentary, enlarged detail vertical section with the extrusion tool and mandrel in the position shown in Fig. 12;

Fig. 15 is a transverse vertical section on the line 15—15 of Fig. 14;

Fig. 16 is an enlarged, detail vertical section, showing the position of stripping tool, at the completion of the stripping operation;

Fig. 17 is a fragmentary vertical section, and

Fig. 18 an elevation of the die-head and pedestal, showing cross-head carrying the same, the die-head in Fig. 18 being shown swung to open position;

Figs. 19 and 20 are elevations of a completely pierced and a partially pierced billet, respectively, the former being preferably employed for mechanical tubing where tubes of unusually accurate concentricity are desired; and Fig. 21 is a time, speed and pressure graph of an extrusion operation on ordinary carbon steel (about 0.30% carbon content) wherein a reduction of 20.9 to 1 is accomplished.

Fig. 22 is a central longitudinal vertical section of a modified form of apparatus which admits of effecting the compound indirect or invert extrusion of the billet into a solid round or bar, showing the position of the parts following the introduction of the billet into the container and immediately prior to the extrusion stroke, and Fig. 23 is a similar view showing the position of the parts at the end of the extrusion stroke;

Fig. 24 is a longitudinal side elevation, partly in section, generally similar to Fig. 1, showing a modified form of apparatus wherein a plurality of oppositely moving hydraulically operated plungers are employed for effecting the extrusion, the same comprising a single main plunger at the front end of the press and twin plungers at the delivery end of the press; and Fig. 25 is a rear elevation of the press shown in Fig. 24.

Fig. 26 is a central longitudinal vertical section similar to Figs. 11, 22 and 23 for effecting compound indirect or invert extrusion of the blank into a hollow shape.

Referring to the drawings and the construction shown therein, the reference numerals 1, 1' designate the main pressure cylinders of a duplex hydraulic press and 2, 2' the main plungers which reciprocate therein, said cylinders and plungers being generally of standard construction, except that the cylinder head 1' and the plunger 2' are centrally cored to receive a tubular guide 3, through which the desired extruded shape is projected after the formation of the same in the die or matrix in the manner hereinafter described. Said cylinders are formed in the usual manner in stationary housings 4, 4' and said plungers 2, 2' are supported by and secured to sliding crossheads 5, 5', each of which latter is adapted to reciprocate on four tie rods 6, 6' that are rigidly connected to the aforesaid housings 4, 4'. The stationary housings, and the tie rods just referred to, together with the underlying and intervening floor (see Fig. 1) constitute a frame for the complete apparatus. A pair of stationary hydraulic draw-back cylinders 7, 7' is also carried by each of said housings 4 and 4'. Piston rods 8, 8' are secured to the pistons (not shown) which reciprocate within said draw-back cylinders, such draw-back cylinders and pistons being of the usual construction and serving to draw-back or return the sliding crossheads 5, 5' which latter reciprocate on said tie rods 6, 6'. A heavy bracket 9 is rigidly bolted to the end face of the crosshead 5 and same serves as a pedestal for a hollow ram element 10, provided with a peripheral thrust flange 12 that is in turn rigidly bolted thereto. Said ram is counter-bored to two different diameters to accommodate a piercer tool of stepped section, hereinafter described. A container-carrying cross-head 15 is also slidably mounted on said tie rods 6, 6', the same being adapted to be quickly traversed thereon to and fro by the piston rods 16, 16' of double acting, hydraulic (or steam) pistons 17, 17' which reciprocate in the cylinders 18, 18' mounted at the respective ends of the press. The piston rods 16 are successively reduced in cross section, as indicated by the reference letters $a$ and $b$ to form shoulders $c$ and $d$, and are threaded adjacent said shoulders to receive nuts 19 and 20, respectively. The nuts 19 serve to lock still another cross-head 21 on the section $a$ of the piston rods 16 against the shoulders $c$ while the nuts 20 serve as stops to limit the extent of movements of the cross-head 15 independent of the movement of the piston rods 16. A container 22, having a liner 23 of special steel that is flanged at one end thereof, as indicated by the numeral 24, is fitted into said cross-head 15 and reciprocates therewith. The edge $e$ of the end of said flange 24 is chamfered and said end projects slightly into an enlarged die-head-receiving recess 25 that has a bottom scale receptacle 26 formed therein. The free ends of the piston rods 16 are adapted to freely slide in the holes 28, except insofar as such movement is limited by the nuts 20 while the piston rods 16' are tapped into the ends of said cross-head, being locked thereto by nuts 27.

A piercer tool 30 extends through said cross-head 21 and is removably, yet rigidly locked thereto, by a nut 29 that is threaded on the reduced end $f$ of the said tool. Said piercer is of enlarged diameter throughout the portion $g$ and is of lesser cross-section beyond the shoulder $h$ formed thereon. A removable nose 31 is secured by means of an interrupted thread (see Fig. 15) to the end of the piercer. Said nose is of special configuration, having preferably a hemi-spherical tip and being of the same cross-section throughout the portion $j$ as the adjacent portion of the piercer, but being of reduced cross-section beyond the truncated cone-shaped shoulder $m$ thereof. The latter functions, as more fully hereinafter explained, to oppose any tendency, especially when extruding small diameter tubes or pipes, for the end section, beyond the shoulder $m$, which constitutes a forming mandrel during the actual extrusion, to elongate or even possibly rupture under the enormous stretching force which would be otherwise exerted on such forming section by the friction exerted by the flowing metal which issues, under enormous pressure, from the container.

This special form of mandrel with a main section of larger diameter than the tip 31 which forms the bore of the hollow shape and which tends to prevent elongation of the mandrel is much more completely disclosed and is claimed in my copending application Serial No. 66,189, filed February 28, 1936.

The piercer tool 30 is employed when it is desired to extrude hollow metal shapes, but is dispensed with while the ram 10 and block 41 are left solid when it is desired to extrude solid shapes. Also, solid shapes may be made with the hollow shape forming parts by merely pushing the piercer tool ahead with the crosshead 5, as will be apparent by viewing Fig. 8, after the blank is enclosed by the container 15.

A hollow pedestal 32 is axially bolted to the sliding cross-head 5' and a swinging or hinged die-head or die-supporting member 33 is secured to said pedestal by pins 34 which latter are adapted to be projected through laterally extending, apertured ears 35 carried by said pedestal and apertured lugs 35' carried by the said die-head, respectively (see Fig. 18). The free end 36 of said die-head is flanged to increase the strength thereof and its resistance to expansional stresses during extrusion of the metal through an annular die or matrix 37, formed of suitable die-steel, that is snugly fitted in a recess 38 formed in such flanged end. A terminal recess 39, having a chamfered or flared side wall 40, is formed in the die-head, the same being adapted to receive the projecting tapered end e of said special steel liner and thereby insure against any radial flashing of the metal between the end of the die and said head, besides centering the die-head, when the same is projected into the recess 25, with respect to the axis of the container.

A removable, hollow forging block 41, which has a conical end 42 and is of a diameter equal to the diameter of the end of the ram 10, relieves the ram from the brunt of the extrusion stroke and the attendant wear to which it would be otherwise subjected. Said block is carried by the nubbin N from the bore of the container, following the completion of the extrusion and the retraction of the die-head to the position shown in Fig. 13.

A stripper tool 45 is inserted into the container immediately following the removal of the block 41. Said tool has a hollow cylindrical base 46 and a cylindrical shank 47. The diameter of the base 46 corresponds to the diameter of said forging block 41 which it replaces. A peripheral thrust flange 48 is formed on said die-head adjacent the end thereof, the same serving as a stop to limit the extent to which the head can penetrate into the container and also to take the stripping thrust during the severing of the nubbin from the finished tube or pipe. Said head is counter-bored to receive the nose 31 of the piercer. The shank 47 has a reduced end 49 of a mean diameter equal to the bore of the extruded shape and an intermediate, square-faced shoulder 50, which constitutes the cutting element of the stripper and which shoulder is of a diameter equal to the minimum diameter of the bore of the die and consequently to the external diameter of the extruded shape. The stripper is axially centered during the stripping operation by the container and the die in which it is supported at its respective ends.

In carrying out the extrusion of a pipe in my improved apparatus by the compound direct extrusion method illustrated in Figs. 8–16, the parts are positioned as shown in Fig. 8 and thereupon a plastic metal billet, either a cylindrical billet or a billet of square cross-section, which is heated to an optimum extrusion temperature, according to its composition, is presented to the container either by suitable tongs or a cradle, as indicated by the reference letter C in Fig. 8, and then, by effecting an appropriate movement of the pistons in the quick-acting traverse cylinders 18', 18', the floating container is caused to move to the right, as indicated by the arrow in Fig. 8, until the container is positioned to completely envelop the billet, as indicated in the dot and dash line of Fig. 9, at which moment said die-head will engage the flanged end 24 of the liner and the piercer tool will be at the extreme limit of its return stroke. Thereupon the piercer tool is caused to advance, by an appropriate movement of the pistons of the traverse cylinders 18, 18, so as to completely pierce the billet as shown in Fig. 11. Immediately power is applied to main cylinders 1, 1' and the ram 10 is caused to advance, while simultaneously the crosshead 21 and the container 22 are correspondingly moved at the same speed in the opposite direction, with the consequence that the metal will be extruded at a rate, based on the billet length, equal to double the rate of movement of either the container or the ram. At the finish of the extrusion stroke the parts will assume the position shown in Fig. 12. The container is then retracted, by means of the traverse cylinders 18', 18', away from the die-head and the nubbin N carried thereby and into the position shown in Fig. 13. The block 41, which will be partially frozen to the nubbin N, will be withdrawn from the container and is then knocked off from the nubbin. The stripper tool is then quickly inserted in place in the position also shown in Fig. 13. Thereupon pressure is then applied through the cylinders 18, 18 to the container which moves toward the die-head and causes the nose of the stripper and the cutting shoulder thereon to project through the die and the nubbin carried thereon, so as to assume the cut-off position shown in Fig. 16. The stripper is withdrawn and the die-head then swung to the position shown in Fig. 18, whereupon the die and nubbin are knocked therefrom and then the nubbin is separated from the die.

The severed tube or pipe is then recovered from the tube guide 3, which latter is of sufficiently greater diameter than that of the finished tube to admit of the free withdrawal through the far end thereof. Following the recovery of the finished shape, the stripping tool is removed from the container and replaced by the block 41 or by a new block, if the old block 41 is worn, then the old die or a new die is inserted in the die-head and the parts of the machine are caused to assume the position shown in Fig. 18, whereupon the cycle of operations is repeated, but employing, of course, a new billet.

It is of course necessary that suitable control means, capable of introducing and discharging water from the cylinders 1, 1' in such a manner as to maintain an equal pressure thereon and the synchronous movement thereof at equal speeds, be provided, such means preferably being interposed in the feed and discharge lines which serve to supply and discharge the water from the respective cylinders, beyond the plungers thereof. Futhermore, in constructing the cylinder 1' and its piston 2', it is necessary, if it be desired that the pistons 2, 2' shall move in exact synchronism and at the same speeds, that such cylinder 1' and piston 2' be sufficiently over-size, as compared with the size of the cylinder 1 and piston 2 to compensate for the area represented by the space occupied by the guide tube 3, in order that the same amount of pressure will be exerted on each of the plungers during the extrusion operation. When so constructed, but a single control mechanism will be required for controlling the movement of both of the pistons 2 and 2'.

Since the nose 31 of the forming tool is arrested when it attains the position shown in Fig. 11, the conical shoulder thereof will be out of contact with the die but in sufficiently close proximity thereto to insure that the portion of the nubbin in proximity thereto will be of minimum thickness and also that the pressure of the rapidly flowing metal passing thereover will react upon said shoulder and oppose any tendency for any portion of the piercing or forming tool to elongate or rupture at the high temperature and pressure to which it is subjected. Moreover, by virtue of the stepped up construction of the piercing or forming tool, the heat is dissipated far more rapidly through the enlarged sections thereof and thus also any tendency for the tool to become excessively or deleteriously heated during the extrusion is prevented, besides enabling the employment of an extremely sturdy tool principally of greater section than the bore of the desired tube or pipe, which is of especial importance where relatively small tubes, whose bore does not exceed about one inch in diameter, are being manufactured.

In those cases where a billet of square cross-section, as shown in Fig. 8, or a cylindrical, previously drilled, billet, such as is shown in Fig. 19, is employed, obviously the length of the same will not be increased by the passage of the piercing tool therethrough, since in the case of the square section billet the displaced metal will occupy the surplus space around the periphery of the billet and in the case of the completely drilled billet, there will be no metal, whatsoever, displaced during the passage of the mandrel therethrough. However, where a partially drilled cylindrical billet, such as shown in Fig. 20, is employed, the piercing thereof will lengthen the same to an extent corresponding to the amount of metal displaced and consequently, if it is desired that the same container be employed for the extrusion type of billet, the length of the container should be amply sufficient to afford sufficient free space to receive the metal displaced in those cases where a partially drilled cylindrical billet is employed. In Figs. 10 and 11 such free space is indicated by the reference letter o.

As illustrated in the graph in Fig. 20, when extruding a pipe of 2" I. D. and 2 1/16" O. D. formed of ordinary carbon steel, at a rate corresponding to about 8" of billet length per second, the pressure applied (from cylinders 18) during the billet charging operation is but nominal and the total time required to remove the billet from the furnace and to charge the same into the container is but about 7 seconds; in the billet piercing operation which consumes but about 3 seconds, a moderate pressure of about 30,000 lbs. per square inch, also applied from the cylinders 18, is required; in the extrusion operation, which is also completed in about 3 seconds, an initial pressure of about 100,000 lbs. per square inch is applied to overcome the inertia of rest and to effect the movement of the metal at the desired rate of flow, following which the pressure required falls to about 100,000 lbs. per square inch and then is gradually increased at the end of the extrusion stroke, to compensate for the cooling of the billet to 120,000 lbs. per square inch, such pressure being applied from the main cylinders 1, 1' to the oppositely, but synchronously moving pistons 2, 2' and thence to the ram 10, the forging block 41 and the oppositely moving die 38; in the mandrel withdrawal stage, which is effected through the return movement or drawback of the cross-head 15, and which requires but about 3 seconds, the pressure applied from the cylinders 18 is but nominal; the stage of manual adjustment of the stripper or cut-off tool requires but about 2 seconds; the stripping of the nubbin, which is accomplished by pressure applied from the main cylinders 1, 1', requires but about 2 seconds, and a low pressure of less than 20,000 lbs. per square inch; and the resetting of the parts of the machine in position for the start of the next cycle of operations requires but a little over 3 seconds. Thus the complete cycle of operations will be effected in about 23 seconds, and of this, the total time of contact of the hot metal with the piercer, the container and the die will be but about 16 seconds.

In the apparatus illustrated in Figs. 22 and 23, wherein is illustrated the manner of effect the compound indirect extrusion of the billet into a solid bar or round, an elongated hollow pedestal 32', carried by the crosshead 5, serves as a support for a telescoping die member 37' that is mounted on the free end thereof, said die being adapted to have a snug sliding fit with a liner 23 of the container 22. When extruding a solid shape, of course, the piercer tool is dispensed with. Moreover, in lieu of the forging block 41 which is employed when effecting direct extrusion, as previously described, a flanged sealing plug 41' is secured to the hollow ram 10, said plug serving to effect the forward movement of the crosshead 15 and the container 22 carried thereby upon forward movement of the ram 10. As a consequence, when the container, which is propelled by said ram, is caused to move synchronously with, but in an opposite direction to the container at speeds in excess of 5" of billet length per second, a billet confined in said container will be extruded through the die into an elongated solid round or bar in the manner shown in Fig. 23. In order to separate the resultant nubbin from the extruded bar, the container is withdrawn from the pedestal, while at the same time the extruded bar is so clamped as to prevent its rearward movement, except to a slight extent sufficient to retract the nubbin away from the mouth of the die. The nubbin can then be cut off and the freed bar is drawn through the pedestal into a receiving trough, such for example as the trough shown in Fig. 25.

As will be apparent from the foregoing, the extrusion operation which is accomplished in the apparatus disclosed in Figs. 22 and 23, constitutes what is known as indirect or invert extrusion, since during the extrusion operation both the billet and the extrusion chamber remain stationary with respect to each other while the die is forced against the end of the billet and into the chamber whereas in the method illustrated in Figs. 8-16, the extrusion effected comprises so-called direct extrusion since the billet is propelled through the extrusion chamber and the walls thereof remain stationary with respect to the die.

In the modified construction illustrated in Figs. 24 and 25, the forward end of the press is identical with that illustrated in Fig. 1, whereas the opposite or delivery end of the press is provided with two opposing main hydraulic cylinders 50 and the pistons 51 which reciprocate therein, are secured to the sliding crosshead 5" which carries the hollow pedestal 32. In this construction a guide tube 52, which is carried by the said crosshead 5", projects between the two cylinders 50 and through a cylindrical passage 53 in the housing 54, the same being adapted to deliver the extruded pipe into a trough 55. Drawback cylinders 77', similar to those employed in the construction shown in Fig. 1, whose pistons are secured by piston rods 8' to the crosshead 5", serve to retract the pistons 51 into the cylinders 50.

In accomplishing my improved method, as is evident from the foregoing description, either by compound direct extrusion (see Figs. 8 to 16) or by compound indirect, or so-called invert extrusion, (see Figs. 22 and 23) are effected hydraulically and the extrusion speed, based on the billet length, is at the rate of double the actual speed of movement of either the die or the ram which are moving in opposition to each other. Such opposing movement of the die is of the utmost importance, in order to obtain a high speed of extrusion far beyond the limits of any commercial large size hydraulic press, for example, a speed of extrusion equivalent to 8" of billet per second in a duplex press in which the opposing plungers and the die are actually moving at a rate of but 4" per second. Moreover, by virtue of the fact that extrusion is partially effected by the invert method and also due to the fact that the die and the floating container are locked together and therefore do not move relative to each other during the extrusion, a peculiar squeezing action is set up which serves to materially reduce the pressure which would otherwise be required to effect the extrusion at the high rate of speed accomplished in my extrusion operation. It is particularly essential in extruding long lengths of tubing that the speed of movement of opposing plungers be in excess of 2½" per second and preferably each of the same is caused to move at a speed between about 3½" to 4½" per second, which speeds are well within the practical limits of a hydraulic press. Thereby, as a consequence, the billet may be reduced at a rate from 5" to 9" per second, with the consequent decisive lowering of the power required for the extrusion operation, particularly where lengths of tubing from 20 ft. to 30 ft. are effected.

My improved extrusion operation, unlike a mechanical extrusion operation, such as disclosed in Patent No. 1,892,789, is not restricted to the employment of a billet, the length of which is not in excess of 2½ times its diameter, for the reason that in my duplex hydraulic press, unlike a mechanical press, wherein substantially all of the effective pressure is applied during the last quadrant of the stroke, the extrusion pressure is continuously applied, gradually and smoothly, throughout the length of the stroke of each plunger. Furthermore, such plunger stroke is but one-half what would otherwise be required were a single hydraulically operated plunger employed. As a consequence, I am able to effect the extrusion at substantially twice the speed that is now possible in any commercial hydraulic press, and I also effect a substantial saving in time consumed in drawing back such plungers in the resetting operation.

The arresting of the forming tool within the mouth of the die in such a manner that there is no relative movement therebetween during the extrusion stroke, not only prevents the metal from obtaining a long frictional grip on such tool, but also enables me to create an opposing or rearward pressure on the forming tool by the action of the flowing metal itself on the shoulder $m$ thereof, which counter-pressure, as stated, in conjunction with the limited grip which is afforded by the nose of the stationary tool, serves to effectively prevent any elongation of the hot mandrel or even possible rupture thereof under the enormous elongation stresses to which it would be otherwise subjected during the extrusion operation.

In the extruson of long lengths of elongated shapes of steels and alloys thereof, the billet or blank employed is desirably heated to within about 150° F. to 400° F. of the melting point, as thereby the resistance due to cooling of the metal during the operation is materially decreased, but at the same time the temperature of any blank extruded should be such that it does not unduly melt or slough and become incapable of sustaining its approximate original shape so as to interfere with the introduction of the same into the die, or to suddenly squirt out with such rapidity as to prevent the forming of a perfect tube or bar in conformity either with the die, in the case of a bar, or of the die and mandrel, in the case of a tube, which are employed. In the extrusion of wrought iron, the temperature to which the billet or blank is heated is a matter of the utmost importance, since if excessively heated, not only will the production of a tube or bar of the desired conformation be impossible for the reasons above stated, but owing to the presence of slag fibers therein, the same in a typical specimen of wrought iron being approximately 2% to 2.25%, it is essential that the temperature to which the blank or billet is heated be maintained well below the sloughing temperature, and sufficiently low so that during the extrusion operation, under the high pressures employed, the tendency for the slag fibers to become displaced and segregated in masses in an extruded shape will be prevented and, on the contrary, the uniform distribution of such fibers in concentric layers, in the shape in which such individual layers the fibers have a general, uniform uni-directional trend, will be accomplished.

When wrought iron shapes are produced in accordance with my improved method, the structure is altered and the physical properties thereof, such as tensile strength, yield point and resistance to fatigue, the transverse and longitudinal strengths, as well as the appearance of buffed surfaces of the same, are decidedly improved, as compared with corresponding properties and characteristics of the wrought iron billets from which such shapes are extruded. For example, a billet of wrought iron which originally had a tensile strength of about 48,000 lbs. per square inch, a yield point of about 28,000 lbs. per square inch, an elongation factor in 8 inches of 18% was, when extruded into a bar, improved to such an extent that it had a tensile strength of about 51,500 lbs., a yield point of about 29,250 lbs. per square inch, and an elongation factor of about 25% and the reduction in area of such extruded tube when so elongated approximated 46.5%. A corresponding improvement of the wrought iron metal wall of a tube extruded by my improved method will also be obtained. Furthermore, in such extrusion of wrought iron tubes, the original slag fibers in the billet are elongated and so-called slag inclusions are substantially eliminated in the extruded tube and the fibers will be so oriented that they arrange themselves in concentric layers in which the individual fibers are of a generally uniform, uni-directional trend, with the consequence that, in addition to the improved physical properties as above specified, the surface appearance to the naked eye when buffed, is noticeably different from similar buffed surfaces of the original blank employed, especially insofar as concerns the generally unblemished character of such surfaces, this being largely due to the absence of disfiguring blotches, such as result from segregations of fibers, or so-called slag inclusions, in such surfaces which tend to alter materially the light reflection and refraction properties of such surfaces.

The maintenance of the die stationary, relative to the container, while the same are both actually in motion, eliminates the excessive friction which would develop were it attempted to effect the telescoping movement of the hot die through the container during the extrusion operation, since if the fit of the die in the container is such as to prevent flashing of the metal therearound, the expansion of the die due to high compression and high temperature thereof, will not only result in setting up excessive friction between the periphery of the die and the inner wall of the container which would cause excessive wear on the outer periphery of the die and the liner of the container and greatly reduce the life of the die and the container lining, but the expansional stresses so set up might even result in the fracture of the die or the liner of the container after but a short period of use. On the other hand, if the fit of such a die so telescoping within a container should be so loose as to overcome such excessive friction being set up, such for example as the die disclosed in Patent No. 1,661,594, then a supplementary shape will be formed externally of the die due to the flashing of the metal therearound, resulting in a waste of metal that would render the extrusion of long lengths of tubes and bars commercially entirely impracticable.

The advantages possessed by my improved hydraulic extrusion method for the production of seamless tubing and pipe are quickly apparent when a comparative study is made of one of the well known mechanical processes of making seamless steel tubing, known as the so-called automatic rotary or Mannesman process, which involves a complicated series of preliminary and finishing operations. In such a process an ingot is first rolled into square blooms, then to remove inherent surface defects, an expensive chipping operation is performed on the bloom after which it is rolled and cut into billets of the same weight and cubical content as the finished tube. These billets are reheated and subjected to a plurality of piercing, expanding, rolling and other incidental operations which require expensive mill equipment and high operating-cost machinery. Frequently specially prepared open-hearth or electric steel ingots have been employed in an effort to eliminate the latent defects in the base material used in these processes, but even then it was not possible to wholly eliminate such defects, even when the billets were subjected to the most rigid inspection, so that they will not appear later in the finished tube, especially since where such defects exist on the inside of the tube, the same cannot be easily detected. Furthermore, it has been impossible to produce seamless wrought iron tubes and pipe by this so-called Mannesman method, primarily because of the fact that ordinary wrought iron billets are structurally not adapted to withstand the severe strains to which the metal is subjected in the preliminary piercing and subsequent expanding and rolling operations.

Still a further advantage possessed by my improved hydraulic extrusion method over the aforesaid Mannesman mechanical method, is the fact that it is possible to produce tubes of far more accurate concentricity and of uniform wall thickness, owing to the fact that the sturdy stepped-up forming tool employed is not only, as previously explained, prevented from stretching during the extrusion, due to the provision of means as herein described for effecting a rearward or counter-pressure on the nose thereof during the extrusion, but also because such sturdy tool is insensitive to cold spots and not easily displaced sidewise thereby and consequently the flowing metal tends to automatically maintain such tool axially of the die throughout the extrusion owing to the even pressure exerted by such metal on the entire periphery of such tool and especially the nose thereof.

Furthermore the length to diameter dimension of the billet employed is desirably 3 to 1. For example, a billet of say 10" in diameter and 30" long is ideally adapted for extrusion by my improved method. The adaptability of my improved method for the employment of such elongated billet renders it possible as hereinbefore stated to utilize a sturdy mandrel of stepped-up section throughout the portion thereof projecting into the container during the extrusion, and consequently, any tendency for the same to become elongated or even ruptured, as hereinbefore stated, is eliminated.

While I preferably utilize a single hydraulic cylinder at each end of the press and project the finished tube through a guide tube axially disposed in one of said cylinders, the employment of a single, main, hydraulic cylinder at the front end of the press and two opposing main hydraulic cylinders at the delivery end of the press, which latter cylinders are disposed on the opposite sides of said guide tube and of a combined capacity equal to that of the single cylinder at the front end of the press, said cylinders having pistons which are all arranged to move synchronously, is also within the scope of my invention.

The movement of the respective hydraulic plungers or pistons at the appropriate intervals and the manner herein specified is accomplished through suitable control means preferably interposed in the feed and discharge lines in communication with the respective ports of the cylinders. Furthermore, the various movements of the interconnected parts of the apparatus are accurately timed, completely synchronized and in full control of but about two operators each stationed at different positions alongside of the machine.

While I preferably effect the simultaneous movement in the same direction of the container and the die while the same are in engagement with each other, I may effect endwise pressure upon a billet by causing the hydraulic plunger at one end of the press to move the container in telescoping relation over the die and the die-head carried by the opposing plunger, while the same is moving in synchronism therewith, but for the reasons herein stated, it is preferable that the die and the container be caused to move together in the same direction and in a direction opposite to the synchronous movement of the ram.

In either case, the billet-container and the mandrel are each carried by the plunger means, such as the main piston 2, which serves to apply endwise pressure to one end of the billet while the die-head and die are carried by the other plunger means, such as the main piston 2', that applies endwise pressure to the opposite end of such billet, but in the latter case the plunger means that carries the container, for example the piston 2, would cause the container itself to react directly on one end of the billet and co-operate with the other plunger means carrying the die-head and die, for example, the piston 2', to effect the extrusion thereof and no extension of the plunger 2, such as the ram element 10, would be required.

This application is a continuation in part of my co-pending application No. 720,167 filed April 12th, 1934.

The expression "compound indirect" extrusion as employed herein is intended to refer to an indirect extrusion operation wherein the extrusion is effected by the movement of a die through a container closed at its rear end while the latter is moving in a direction opposite to that of the die whereby the indirect extrusion is effected at double the speed obtainable in a simple indirect extrusion operation.

The indirect or invert extrusion of hollow shapes, best shown in Fig. 26, is effected quite similarly to the direct hollow shape extrusion hereinbefore described in detail, and like the indirect solid shape extrusion of Figs. 22 and 23 just described in detail. The piercer tool 30 and ram 10 of the direct extrusion apparatus together with the driving mechanism therefor may be used. However, as shown in Fig. 26 the back of the container is closed with a block 41a adapted to slidably receive the piercer tool 30 and to block the ram 10. Slightly modified stop rods 16' are provided to limit movement of the piercer tool relative to the die 37' by engaging the die crosshead 5', to be moved to the left concurrently with the die as the latter passes into the container and while the container is travelling toward the right. Thus, the blank is enclosed in the container 15 with the die 37' and with the ram 10, the piercer tool is moved through the blank into predetermined relation to the die, and thence the ram blank and container are hydraulically projected to the right (as viewed in Fig. 26), while the die and the piercer tool are simultaneously and hydraulically projected to the left.

The expression "blank" and "billet" as used herein are intended to be synonymous, and to describe a large block of metal which is to be extruded.

Various modifications within the scope of the appended claims may be made without departing from the spirit of my invention.

Having thus described my invention, what I claim and desire to obtain by United States Letters Patents is:—

1. In a hydraulic extrusion press, the combination comprising opposing main hydraulic cylinders having oppositely and synchronously movable plunger elements respectively associated therewith, one of said plunger elements carrying a die, a slidable container mounted between said plunger elements and adapted to be moved by one of said plungers, but being also movable independently thereof, a mandrel member axially slidable within said container while the latter is stationary and means, independent of said plungers, for effecting movement of said mandrel and said container relative to each other and for causing them to move together in the same direction while said plungers are simultaneously moving in opposed directions.

2. In a hydraulic extrusion press, the subcombination comprising a container, guide members on which said container is slidable, a cross-head, said cross-head extending across the longitudinal axis of the press, a mandrel carried by said cross-head, a plurality of hydraulically operated main plungers, certain of which are respectively disposed at opposite ends of said container, an extrusion tool adapted to be projected into said container by certain of said plungers and at least one of the other of said plungers being adapted, during the extrusion stroke of the press, to effect movement of said container along said guide members, means for effecting limited movement of said container independently of said plungers or said crosshead and other means for effecting movement of said cross-head and said container simultaneously in the same direction during the extrusion stroke of the press.

3. In a duplex hydraulic extrusion press, the combination comprising a slidably mounted, blank-container, oppositely disposed plunger means adapted to apply endwise hydraulic pressure on the respective ends of a blank when confined in said container, a die-carrier carried by such plunger means as serves to apply endwise pressure to one end of such a billet, a hollow die mounted on said carrier, a reciprocable mandrel adapted to be projected centrally into the mouth of said die, said mandrel and said container each being slidably carried by the plunger means which serves to apply endwise pressure to the other end of the blank, means for moving said container and mandrel independently of each other and also independently of the movement of said plunger means and hydraulic cylinders associated with said plunger means for causing the latter to simultaneously effect the extrusion of a blank so confined in the container when the latter has been moved to an extrusion position.

4. In the method of hydraulically making elongated solid and hollow ferrous metal by hot hydraulic extrusion, the steps which comprise presenting a hot plastic metal blank to the mouth of an open container, causing said container to move longitudinally and envelop said blank and then, while said blank is confined within said container and while effecting the movement of said container at a speed relative to the ground of between 2½" and 5" per second in a direction opposed to the direction of its first movement hydraulically, causing ramming elements, each moving in an opposite direction with respect to the other at a rate of speed relative to the ground of between 2½" and 5" per second and while the container is moving with one of them to exert endwise pressure in the opposite ends of such blank and effect its extrusion from the container at a speed, relative to the ground, of from 5" to 10" of billet length per second.

5. In the method of hydraulically making elongated solid and hollow ferrous metal by hot hydraulic extrusion, the steps which comprise positioning a hot plastic metal blank in a container and then effecting the indirect extrusion of the metal of such blank by causing said container, while one end thereof is closed and while said container is moving longitudinally, to exert endwise pressure hydraulically on one end of said metal blank and simultaneously causing a die member, while the same is moving longitudinally in a direction counter to and during movement of said container, to exert endwise pressure hydraulically on the other end of said blank sufficient to effect the extrusion of the metal of the blank from the container through a die at a rate of speed, relative to the ground, of between 5" and 10" of billet length per second.

6. In a hydraulic extrusion press the combination of a frame, opposed main cylinders on said frame; a container slidable on the frame between said cylinders and during the extrusion operation for supporting a heated metal blank, opposed plungers in said opposed main cylinders, a die carried by one plunger, a ram carried by the other plunger, and means for simultaneously moving the die and ram toward each other, to compress the blank in the container and to extrude it through the moving die.

7. In an extrusion press the combination of a ram, a die, a container for holding a heated metal blank, and means for moving said die and ram toward each other and the container with one of them simultaneously to compress the blank in the container and to extrude metal thereof through the die.

8. In an extrusion press the combination of a ram, a die, a container for supporting a heated metal blank, means for abutting the die against the container, and means for moving the die and the container with the blank therein in a straight path and simultaneously moving the ram in a direction counter thereto, to extrude metal of the blank through the moving die.

9. In an extrusion press the combination of a frame, a ram, a die, a container for supporting a heated metal blank, means for maintaining the ram in fixed relation to the container, and means for concurrently moving the ram, container and the metal blank on the frame in a straight path, and simultaneously moving the die in an opposed direction, to extrude metal of the blank through the die.

10. In an extrusion press the combination of a ram, a die, a piercing mandrel, a container for supporting a heated metal blank, means for moving the piercing mandrel through the blank into a predetermined position relative to the die, and means for moving the die, the mandrel, and the container with the blank therein concurrently in one direction while simultaneously moving the ram in opposed direction, to extrude metal of the blank through the moving die and around the moving mandrel.

11. The method of hydraulically extruding ferrous metal shapes which comprises the steps of placing a heated metal blank in a container, hydraulically projecting the container and blank in one direction, and simultaneously projecting a die hydraulically into the moving container to compress the blank and to extrude the metal of the blank through the moving die.

12. The method of hydraulically extruding ferrous hollow metal shapes which comprises the steps of placing a heated and plastic metal blank into a container, confining said blank in the container with a ram and a die, forcing a mandrel through said blank into a predetermined position relative to the die, and hydraulically moving the container and the blank therein and the associated die and mandrel conjointly in one direction and simultaneously moving the ram hydraulically in opposed direction to compress the metal of the blank and extrude it through the moving die.

13. The method of hydraulically extruding hollow ferrous metal shapes which comprises the steps of gripping a heated metal blank with a die and a ram, moving a container over the blank, forcing a mandrel through the blank and maintaining it in predetermined relation to the die, and of simultaneously hydraulically moving the container with the blank therein and the associated die and mandrel conjointly in one direction and at the same time hydraulically moving the ram in a direction counter thereto, to extrude metal of the blank through the moving die.

14. The hydraulic method of hot extrusion of solid and tubular ferrous metal shapes, which comprises introducing into a slidable container, a heated ferrous metal blank, closing of said ends of the container by introducing in one end of same an extrusion tool and against the other end of the container a die-carrying closure head, hydraulically applying equal, axially aligned, opposed pressures to the extrusion tool and the closure head and causing each to move at a rate of speed in excess of 2½" per second to cause the extrusion of hot metal of the billet at a rate of speed of not less than 5" per second.

15. The method of hydraulically extruding ferrous metal shapes which comprises the steps of placing a heated and plastic metal blank into a container; moving a die and a ram to the container to confine the blank therein; and simultaneously hydraulically moving both the die and the ram toward each other and hydraulically moving the container with one of them to compress the blank within the container and to extrude the metal of the blank through the die.

16. The method of hydraulically extruding ferrous metal shapes which comprises the steps of placing a heated and plastic metal blank into a container; moving a die and ram to the container to confine the blank therein; and of hydraulically moving the die and the container with the blank therein in one direction and simultaneously hydraulically moving the ram in a counter direction to compress the blank and extrude the metal thereof through the die.

17. The method according to claim 15 which comprises subjecting a metal blank of a length which is substantially in excess of 2½ times its diameter to the action of the hydraulically moved die and ram, and extruding it through the moving die.

18. The method of hydraulically extruding ferrous metal shapes which comprises the steps of locating a heated metal blank longitudinally relative to a machine; simultaneously moving a container, die, and ram longitudinally of the machine and relative to each other to confine the blank in the container; and subsequently hydraulically moving the die and container together in one direction and the ram in opposed direction simultaneously, to simultaneously project the blank and to flow the metal of the blank through the die.

19. The method of hydraulically extruding ferrous metal shapes which comprises the steps of locating a heated and plastic metal blank relative to a machine; confining the blank in a container with a die and a ram; and of concurrently hydraulically moving the container, blank therein, and die at a speed in excess of 3" and less than 5" per second and simultaneously hydraulically moving the ram counter thereto at a speed in excess of 3" and less than 5" per second to effect an extrusion displacement of the blank length per second equal to the combined travel per second of the container and associated die and the opposed plunger.

STANLEY W. SPARKS.